May 17, 1960 W. L. GARBERDING 2,936,659
CUTTING TOOL
Filed Sept. 27, 1957 2 Sheets-Sheet 2
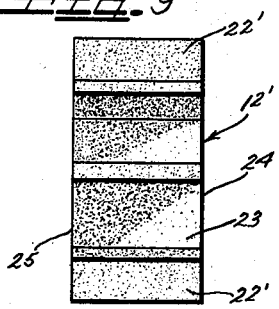
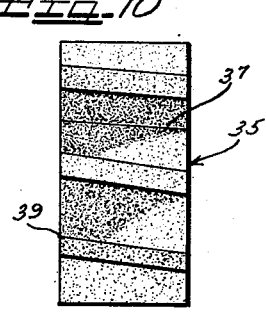
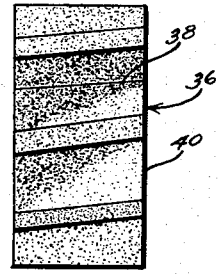
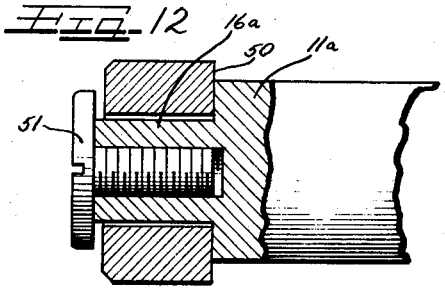
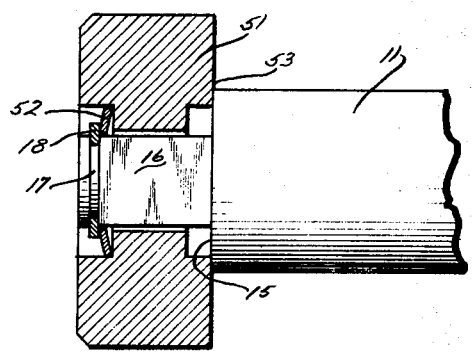
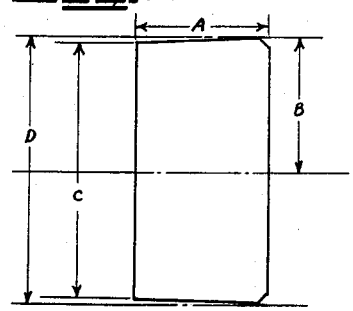
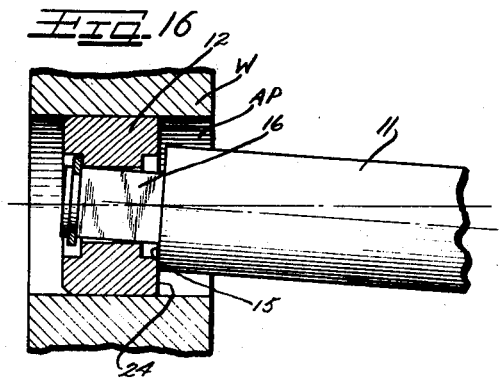
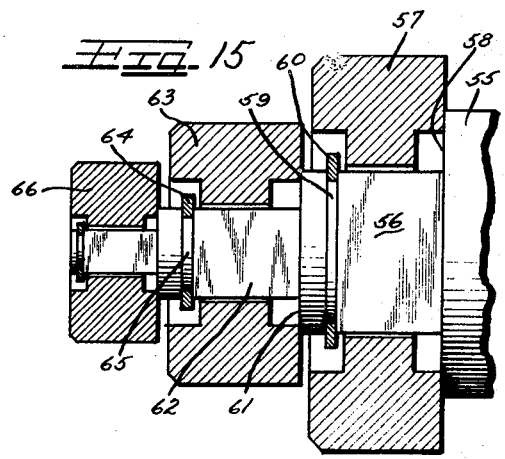
Inventor
WALDO L. GARBERDING
By Hill, Sherman, Meroni, Gross & Simpson Attys

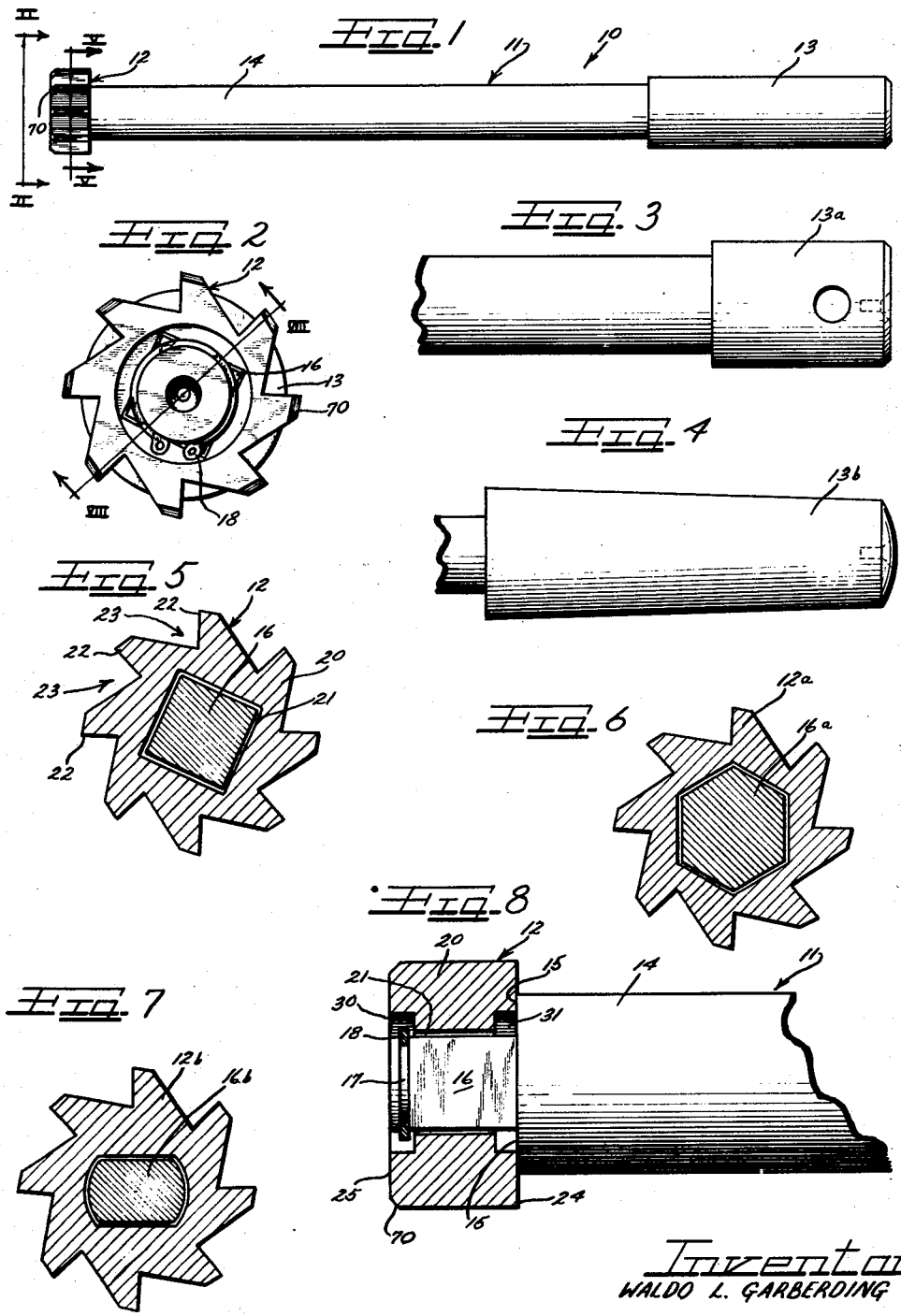

United States Patent Office 2,936,659
Patented May 17, 1960

2,936,659

CUTTING TOOL

Waldo L. Garberding, Libertyville, Ill.

Application September 27, 1957, Serial No. 686,623

4 Claims. (Cl. 77—72)

This invention relates generally to cutting tools, and more specifically to an improved rotary cutting tool having a removable cutting head incorporated therewith.

Although the principles of the present invention may be included in various cutting tools, a particularly useful application is made in reamers which are used for producing a high-grade finish in a hole, and which are used to closely size the dimension of an aperture.

It has been commonplace to rely on the machine tool or driving mechanism to impart the requisite rigidity to the tool for closely positioning the location of the opening to be machined, and to rely on the inherent tool rigidity for controlling the diameter of the opening. Furthermore, it has been customary to provide the cutting portion of reamers, and similar tools, integrally with the shank of the tool. Still further, it has been heretofore necessary to provide entirely separate and different tools for right-hand and left-hand cutting. Still further, where concentric surfaces are to be simultaneously reamed, it has been conventional to provide a single relatively high cost special cutter capable of taking the various cuts, such cuts being taken by various cutting portions typically provided integrally with the shank of the tool.

The present invention contemplates the utilization of a tool holder on which a reamer head floats. This concept rejects the use of the driving mechanism as a stabilizing influence for the tool, but in place thereof, relies on the aperture being machined in the workpiece to control the alignment of the floating cutting head.

Still further, the present invention provides a cutting head which is removable from the holder and therefore replaceable. In being replaceable, special materials may be utilized for the construction of the cutting head, such materials being selected without regard to the properties needed by the holder. Another feature is that the instant invention allows the substitution of dull or damaged cutters, without scraping the shank portion of the tool.

Accordingly, it is an object of the present invention to provide a low-cost efficient cutting tool.

Another object of the present invention is to provide a cutting tool which employs a replaceable cutting head.

Yet another object of the present invention is to provide a reamer which is capable of producing a higher quality of surface finish than has heretofore been available by a reamer under similar circumstances.

Still another object of the present invention is to provide a reamer which may be used to machine to closer tolerances than has heretofore been possible for a given dimension.

Still yet another object of the present invention is to provide a holder for a replaceable cutter.

A still further object of the present invention is to provide a blank for a cutter head.

Yet another object of the present invention is to provide a replaceable cutter head for a cutting tool.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawings:

Figure 1 is a side elevational view of a reamer provided with a removable cutting head in accordance with the principles of the present invention;

Figure 2 is an enlarged elevational view of the reamer of Figure 1, taken along line II—II;

Figure 3 illustrates a stub reamer holder which may be substituted for the straight shank of Figure 1;

Figure 4 illustrates a tapered shank reamer holder which may be substituted for the straight shank reamer holder of Figure 1;

Figure 5 is an enlarged cross-sectional view taken along line V—V of Figure 1, with circular portions of the shank omitted;

Figures 6 and 7 are each similar to Figure 5 and illustrate an alternate internal configuration;

Figure 8 is a cross-sectional view, partly in elevation, taken along line VIII—VIII fo Figure 2;

Figure 9 illustrates a cutter head blank having straight flutes;

Figure 10 illustrates a cutter blank having helical flutes;

Figure 11 illustrates a cutter head blank having helical flutes of a direction opposite to that of Figure 10;

Figure 12 is generally similar to Figure 8, but discloses a slightly modified embodiment of the instant invention;

Figure 13 is also generally similar to Figure 8, but discloses a still further slightly modified embodiment of the instant invention;

Figure 14 is a dimensional diagram which is applicable to all of the cutters disclosed herein;

Figure 15 illustrates a still further embodiment of the instant invention wherein a plurality of cutters are carried on a single shaft; and Figure 16 illustrates how the embodiment of Figure 8 adapts itself to a misalignment between the workpiece and the tool holder.

As shown on the drawings:

The principles of this invention are particularly useful when embodied in a reamer assembly such as illustrated in Figure 1, generally indicated by the numeral 10. While the instant invention has been disclosed in connection with a reamer, it will be understood that cutting heads having teeth on their faces may also be provided advantageously in accordance with the principles of the instant invention. The reamer assembly 10 includes a holder generally indicated by the numeral 11, and a cutter or cutter head generally indicated by the numeral 12. The holder of Figure 1 has been provided with a straight portion 13 which may be drivably supported in a rotating chuck (not shown) driven by a machine tool. It is to be understood that the construction of the straight portion 13 in the instant embodiment does not comprise a part of this invention. Accordingly, other means may be provided at this one end for being drivably supported in a rotating chuck. Thus a stub holder 13a such as shown in Figure 3, and a tapered holder 13b such as shown in Figure 4 may be incorporated in the tool of this invention. These additional styles of ends are shown for purposes of illustration only, and do not limit the types of ends which may be provided on the holder 11.

The holder 11 further includes a shank 14, the end of which may be seen more clearly in Figure 8. The shank 14 of the holder 11 is provided with a shoulder 15 which is directed away from the other end of the holder, and which is perpendicular to the principal axis of the holder 11. It will be noted that the diameter or outside dimension of the shank 14 is less than the overall diameter or dimension of the cutter 12. The significance of this point is explained later herein.

The shank 14 is provided with a noncircular driving portion 16 projecting axially from the shoulder 15. The embodiment shown in Figures 1, 2, 5 and 8 has a square configuration for the portion 16. However, it is to be understood that any noncircular or driving configuration may be utilized, samples of other configurations being shown by way of illustration in each of Figures 6 and 7 and be denoted 16a and 16b, respectively.

The noncircular driving portion 16 is adapted to receive means for holding the cutter 12 on such portion 16, here generally indicated as comprising a slot 17 for receiving a snap ring 18 therein, as best seen in Figures 2 and 8. It will be noted that the snap ring 18 is carried at the distal end of the portion 16 and is spaced from the cutter 12 to loosely limit the axial movement of the cutter 12 on the portion 16. It is to be understood that any other conventional means, such as a screw, may be used for this purpose.

Referring to Figures 5 and 8, the cutter 12 includes a body 20 having an axial opening 21 extending therethrough, and receiving the drive portion 16. Accordingly, the opening 21 preferably has the same general configuration as the drive portion 16 and is therefore noncircular. The body 20 also includes a plurality of radial cutting teeth 22 having axial flutes 23 extending therealong. The body 20 includes a pair of surfaces 24 and 25 which extend perpendicular to the rotational axis of the body 20. The surface 24 is shown in engagement with the shoulder 15 whereby the shoulder 15 may impart an axial thrust against the surface 24.

It is apparent that if the snap ring 18 be removed, the cutter 12 may also be removed axially from the portion 16 of the holder 11. Accordingly, the cutter 12 may be replaced by other cutters if dull or broken, or by other cutters of different sizes, thereby allowing the use of the holder 11 with an infinite number of cutters 12. In any event, whichever cutter is used with the holder 11, there is driving engagement therebetween for corotation thereof.

It will be noted that the external dimension of the driving portion 16 is somewhat smaller than the internal dimension of the axial opening 21. Accordingly, there is provided a peripheral clearance between the cutter 12 and the holder 11. It is thus apparent that if the opening in the workpiece which receives the cutter 12 is slightly eccentric with respect to the rotational axis of the holder 11, the cutter 12 will drift or shift radially with respect to the driving portion 16, the amount of course depending on the amount of eccentricity and on the amount of peripheral clearance around the driving portion 16. Accordingly, the instant tool may thus be used even though there is not perfect radial alignment between the workpiece and the cutter. Thus the cutter 20 has a rotational axis which is defined by the axis of the hole being machined in the workpiece.

As has already been noted, there is an axial clearance between the cutter 20 and the snap ring 18. Thus the cutter 12 slidably engages with the portion 16. Accordingly, the cutter 12 may be described as "floating" on the end of the holder 11. It is thus also apparent that the cutter 12 may shift angularly with respect to the principal axis or axis of rotation of the holder 11. Such an angular shift is best shown in Figure 16 wherein a workpiece W having an aperture AP receives the cutter 12 driven rotationally by the holder 11. Since the axial force between the holder 11 and the workpiece W is delivered through the shoulder 15 against the surface 24 at a point intermediate the center of the cutter and its periphery, and since the reaction to such force occurs at the outer periphery or teeth of the cutter 12, which have a somewhat longer moment arm, the cutter 12 is invaribly aligned by the aperture AP, the holder 11 continuing to provide the rotational force as well as the axial thrust. Thus there may be an angular shift between the cutter 12 and holder 11 to allow for angular misalignment between the aperture AP and the holder 11.

As best shown in Figure 8, the aperture 21 is made wider at its outer ends, such as by the provision of a counterbore or recess 30 and 31 at each of the surfaces 25 and 24, respectively. While the counterbore 30 also provides a recess for receiving the snap ring 18 to permit reaming or cutting up to the bottom of a blind hole, both the recesses 30 and 31 also function as best shown in Figure 16 to increase the amount of angular shift which is possible for a given peripheral clearance between the portion 16 and the cutter 12, and for a given length of the portion 16.

I have found that reamer structures which are provided with floating heads as described herein produce a somewhat smoother finish within the reamed aperture. By way of example, a finish of 60 microinches is not uncommonly produced by this method under circumstances where a finish or surface roughness of 120 microinches is expected from conventional reamers.

Where there is an angular misalignment between the rotational axis of a conventional reamer and the aperture in the workpiece which is to be reamed, the conventional reamer produces a widening of the hole or aperture making one or both ends either bell mouthed or oval mouthed. When the aperture itself can coact with the floating cutter 12 to pilot the cutter, and to override any angular misalignment with respect to the cutter holder, such misshaping or misdimensioning of the ends of the aperture is entirely precluded.

A cutting tool constructed in accordance with the principles of this invention also includes further features which are of benefit in connection with the manufacture thereof. The users of cutting tools, such as reamers, frequently desire to obtain tools which are manufactured to a precise dimension of a value not comprising a standard stock size and hence "special" in dimension. In anticipation of such requirements, the holders 11 may be completely fabricated in advance. Further, the cutter 12 may be partially manufactured, namely, as blanks such as shown in Figures 9, 10, and 11. The structure shown in Figure 9 is the blank from which the cutter 12 of Figure 1 was manufactured and is identified by the numeral 12'. The cutter blank 12' may comprise material such as tungsten, Stellite or other cast alloys, carbides and ceramics.

It will be noted that the blank 12' has straight flutes 23 which are parallel to the rotational axis of the blank 12'. The details of the construction of the teeth 22 are conventional and do not form a part of the instant invention. However, the unfinished teeth 22' in the blank 12' are made parallel to each other, and are made to a dimension exceeding the dimension D of the finished cutter, indicated in Figure 14. Therefore, the blank 12' is finished, such as by grinding two dimensions D and C. The difference in the dimensions C and D has been exaggerated for the purpose of clarity. However, it is conventional to use a small amount of taper along the length of the teeth, the wider end representing the entrant end of the cutter 12. To identify the entrant end and to facilitate entrance of the entrant end, a chamfer 70 is typically included at the entrant end as shown in Figures 1, 2, and 8.

It will be noted that when the blank has been finished so that the surface 25 defines the entrant end, the cutter is a right-hand cutter, as best seen in Figure 2. However, the use of a blank such as 12' also permits the blank to be so finished that the surface 24 is the entrant end. If this be done, the cutter upon being reversely installed, is a left-hand cutter. Accordingly, the cutter of the instant invention may be converted from either a right-hand or a left-hand cutter to one of the opposite hand of a smaller dimension, by conventional re-grinding. It is also apparent that when straight flutes 23 are provided in the blank, the rotation of the cutter 12 produces no significant axial transfer of the chips produced.

Referring now to Figures 10 and 11, it will be noted that there is shown an additional pair of blanks 35 and 36. The blank 35 has a helical flute 37 while the blank 36 has a helical flute 38 of the opposite hand. The blanks 35 and 36 may each be made into right-hand or left-hand cutters, depending upon which face or end is finished as the entrant end. However, the right-hand cutter made from the blank 35 will draw the chips to the surface 39 while a right-hand cutter made from the blank 36 will draw the chips to the surface 40. Thus while both the blanks 35 and 36 may be made into right-hand cutters, the chips produced thereby are moved in opposite axial directions due to the difference in angle of the flutes 37 and 38.

Of course, the blanks 35 and 36 may each be finished as left-hand cutters, which of course respectively also move the chips produced in opposite axial directions. It is thus apparent that for a given range of cutter diameters, a set of three blanks is sufficient to provide all of the possible combinations as to direction of rotation and as to direction of chip advancement which may be needed for a certain cutter.

Referring now to Figure 12, there is shown a slightly modified form of the instant invention. This figure illustrates two slight modifications. The first of these is that the diameter of the cutter 50 has been made relatively smaller than is the diameter of the cutters shown in figures heretofore discussed. Referring now to Figure 13, there is shown a cutter 51 having a diameter somewhat relatively larger than those previously discussed. It will be noted that the length of the cutter A, indicated in Figure 14, is no larger than the radius B of such cutter. This relationship is true for each of the cutters disclosed herein. However, as the diameter or size of the cutter increases, it does not become necessary to proportionately increase the length A of such cutter. I have found therefore that the length A may be equal to or less than the radius B, and that the length A ordinarily need not exceed ¾".

Referring again to Figure 12, there is shown a means 51, comprising a large headed screw, which is received in the driving portion 16a of the holder 11a. The means or screw 51 is here used to hold the cutter 50 on the holder 11a, and to loosely limit relative axial movement therebetween. It will also be noted that the recesses or widening of the ends of the aperture in the cutter 50 may be omitted where desired. This type of construction has been found to be advantageous for cutters having relatively small diameters.

Referring again to Figure 13, it will be noted that a spring 52, such as a wave washer or a belleville washer, has been interposed between the snap ring 18, which is received in the groove 17 of the driving portion 16, and the cutter 51, whereby the surface 53 is biased against the shoulder 15 of the holder 11. The use of biasing means intermediate the retaining means and the cutter has been found advantageous, particularly where the diameter of the cutter 51 is of the relatively larger sizes, in that it aids in the preliminary alignment thereof with respect to the aperture in the workpiece. Of course, it is to be understood that a spring may be used also with the structure of Figures 8 and 12 if such be desired. The strength of the spring is sufficiently low so that it does not preclude angular shifting between the holder and the cutter.

Referring now to Figure 15, there is shown a holder 55 having a driving portion 56 on which is received a cutter 57. The holder 55 has an axially directed shoulder 58 from which the driving portion 56 generally projects. If desired, the driving portion 56 may also include means for holding the cutter 57 axially thereon, for example, a groove 59 and snap ring 60. It will be appreciated that this much of the structure of Figure 15 is substantially identical to that shown in Figure 8. The distal end of the driving portion 56 defines a second axially directed shoulder 61 from which projects a second axially directed driving portion 62 which also drivably carries a cutter 63 thereon. A retaining means may also be included as for example the snap ring 64 carried in a groove 65 in the driving portion 62. It will be noted that the cutter 63 is axially spaced from the cutter 57 and is supported by a common holder, each of which cutters are independently removable or replaceable. One or more additional cutters 66 may be similarly supported for simultaneous rotation with the other cutters, the number of course depending upon the job requirements. It is to be understood that one or more of the cutters 57, 63, and 66 may be omitted, or that more cutters be provided on additional driving portions. It is also to be understood that the respective driving portions may be made somewhat longer than represented to further axially space the various individual cutters.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A cutting tool comprising, in combination: a holder adapted at one end to be drivably supported in a rotating chuck, said holder having a shoulder directed away from said one end and perpendicular to the principal axis of said holder; a non-circular driving portion projecting axially from said shoulder; a replaceable fluted cutter having an overall axial length substantially equal to the length of said non-circular driving portion, one end of which length is defined by a flat end face rockably engageable with said shoulder and slidable thereon under load in any radial direction said cutter having an axial opening corresponding to configuration to said portion and receiving the same for corotational driving engagement therewith, said cutter and said holder having a peripheral clearance therebetween along the entire axial length of said cutter for permitting said cutter to shift radially with respect to the principal axis of said holder, so that the tool may be used even if the rotational axes of said holder and cutter are offset from each other; and means removably carried by said portion axially spaced from said cutter for permitting limited cutter movement axially away from said shoulder.

2. A cutting tool comprising, in combination: a holder adapted at one end to be drivably supported in a rotating chuck, said holder having a shoulder directed away from said one end and perpendicular to the principal axis of said holder; a non-circular driving portion projecting axially from said shoulder; and a replaceable fluted cutter having a pair of spaced parallel thrust surfaces defining an axial length substantially coextensive with the length of said driving portion, one end of which length is defined by a flat end face rockably engageable with said shoulder and slidable thereon under load in any radial direction said cutter having an axial opening extending between said surfaces and corresponding in configuration to said projection for slidably receiving said projection; said cutter having rotational driving engagement with said portion and having peripheral clearance with said portion along the entire axial length of said cutter for permitting said cutter to shift radially; said cutter being substantially symmetrical about a plane intermediate said surfaces so that said cutter is selectably positionable on said portion with either of said surfaces and slidably and rockably engageable with said shoulder for axial engagement thereagainst, whereby said tool may also be selectably employed for cutting in either direction of rotation.

3. A cutting tool comprising, in combination: a holder adapted at one end to be drivably supported in a rotating chuck, said holder having a shoulder directed away from said one end and perpendicular to the principal axis of said holder; a non-circular driving portion projecting axially from said shoulder; a replaceable fluted reamer cutter having an axial length less than its radius and substantially coextensive with the length of said driving portion, one end of which length is defined by a flat end face rockably engageable with said shoulder and slidable thereon under load in any radial direction said cutter having an axial opening corresponding in configuration to said portion and receiving the same for corotational driving engagement therewith, said cutter and said holder having a peripheral clearance therebetween along the entire axial length of said cutter for permitting said cutter to shift radially with respect to the principal axis of said holder, so that the tool may be used even if the rotational axes of said holder and cutter are offset from each other; and means removably carried by said portion axially spaced from said cutter for permitting limited cutter movement axially away from said shoulder.

4. A cutting tool comprising in combination: a holder adapted at one end to be drivably supported in a rotating chuck, said holder having a shoulder directed away from said one end and perpendicular to the principal axis of said holder; a non-circular driving portion projecting axially from said shoulder and defining a second shoulder; a second non-circular driving portion projecting axially from said second shoulder; a pair of replaceable fluted cutters each having an axial length substantially coextensive with the length of one of said driving portions, respectively, each of said cutters having an axial opening corresponding in configuration to said respective portions and receiving the same for corotational driving engagement therewith, each of said cutters having a peripheral clearance with the respective portions, said peripheral clearances extending along the entire axial lengths of said cutters for permitting each of said cutters to shift radially with respect to the principal axis of said holder, so that each of said cutters may be simultaneously rotated about rotational axes which do not coincide with each other or with the principal axis of said holder; and means removably carried by said second portion axially spaced from the adjacent cutter for permitting limited cutter movement axially away from said second shoulder.

References Cited in the file of this patent

UNITED STATES PATENTS

| 352,829 | Mansfield | Nov. 16, 1886 |
| 2,153,236 | Christman | Apr. 4, 1939 |

FOREIGN PATENTS

| 459,122 | Germany | Apr. 28, 1928 |